(No Model.) 7 Sheets—Sheet 4.

W. TAYLOR.
WIRE NAIL MACHINE.

No. 415,480. Patented Nov. 19, 1889.

Witnesses—
Josiah W. Ells
Jonas Lindley

Inventor—
William Taylor (No Model.) 7 Sheets—Sheet 5.

W. TAYLOR.
WIRE NAIL MACHINE.

No. 415,480. Patented Nov. 19, 1889.

(No Model.) 7 Sheets—Sheet 7.

W. TAYLOR.
WIRE NAIL MACHINE.

No. 415,480. Patented Nov. 19, 1889.

Witnesses:
J. B. McGinn.
B. W. Sommer.

Inventor:
William Taylor
by Doubleday & Blie
attys

United States Patent Office.

WILLIAM TAYLOR, OF ALLEGHENY, PENNSYLVANIA.

WIRE-NAIL MACHINE.

SPECIFICATION forming part of Letters Patent No. 415,480, dated November 19, 1889.

Application filed June 25, 1887. Serial No. 242,555. (No model.)

*To all whom it may concern:*

Be it known that I, WILLIAM TAYLOR, a citizen of the United States, residing at Allegheny, in the county of Allegheny and State of Pennsylvania, have invented a new and useful Improvement in Machines for Making Wire Nails, of which the following is a specification, which will be readily understood by reference to the accompanying drawings, wherein—

Figs. 14 to 30 show a number of details of the machine.

To construct a wire-nail-making machine in accordance with my invention, I provide a strong cast-iron frame 1, across which is arranged the main shaft 2, on one end of which are placed, side by side, a loose and fast pulley 3 4, by means of which power may be communicated to the moving parts, and to steady the revolutions of the shaft a balance-wheel is used beside the aforementioned pulleys.

Located on the extreme opposite end of the main shaft 2 and rigidily secured thereto is a thick disk 5, having across its face a dovetailed groove, in which is fitted an eccentric bearing adjustable with respect to the axis of the main shaft 2, having a crank-like movement, the stroke of which may be varied and regulated to suit the requirements of the case.

Figures 6, 10:
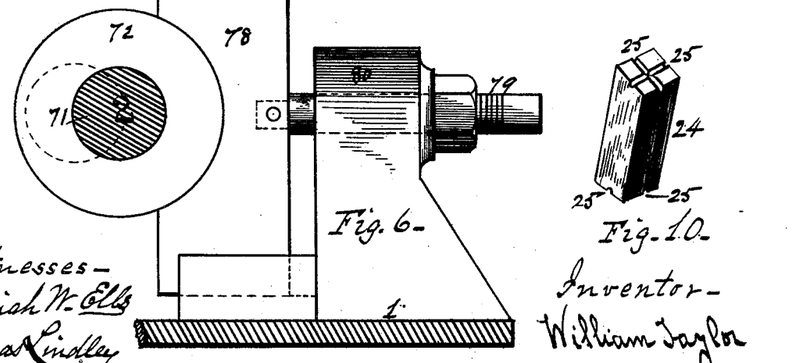
Fig. 6, a detached portion of the machine, showing an adjustable block placed behind the main crank-shaft.
Fig. 10, a perspective view of one of the reversible gripping-dies.

In Figs. 27 to 30 are shown the devices constituting the eccentric bearing used for connecting the disk 5 to the parts it actuates. The wrist-pin 6 is mounted in or carried by the slide shown in Fig. 30 and has the bushing-sleeve 108 around it. This bushing lies between the two halves 103 and 104 of a divided bushing. The latter are placed in a yoke 106, through the end wall of which passes the adjusting-screw 107, bearing against a steel or other washer 105. The yoke 106 is connected by a threaded socket to one end of a long connecting-rod 7, its other end being jointed to the arm 8 of a projecting slide 9, supported in suitable bearings 10 11, whereby the slide 9 will be given a reciprocating movement back and forth corresponding with the throw of the wrist-pin 6. From this slide 9 extends another arm 12, that connects the same with a horizontally-moving block 13, provided with a spring-jaw 14 or "monkey-grip" for seizing and feeding the wire into the machine. The wire on its passage to the machine is drawn between a series of small rolls 15 by the intermittent action of the feeding device for the purpose of straightening the wire. One set of these rolls 15 is arranged in a straight line, one after the other, each adapted to revolve around a separate and independent journal securely attached to that portion of the main frame. The other or opposite set of rolls have journals fixed to a movable plate 16, whereby they may be adjusted simultaneously and together toward or from the fixed set of rolls by means of a suitable hand-screw 17, and when so adjusted kept in that position by a similar hand-screw 18, arranged in a proper support beneath said movable plate 16. Between this movable plate 16 and the bearing or support of its adjusting-screw 17, and on each side thereof, is a short spiral spring 19, that affords a slight yielding movement to one end of the plate or the other, proportioned to the irregular condition of the wire passing between the rolls. As the wire is drawn through or between these straightening-rolls and driven along by the intermittent action of the feeding device it eventually reaches and is thrust through a small hole 20 in a strong vertical wall 21, securely attached to or forming part of the main frame. Close against the back of this strong vertical wall 21, and held thereto by means of clamps 22 and screws 23, are a pair of hardened-steel dies 24, having two grooves 25, that intersect and cross each other, as shown in the perspective view, Fig. 10, whereby they are not only made reversible end for end, but different-sized grooves by this means may be used, corresponding with the different sizes of wire, without having more than one pair of such dies. These double-ended grooved dies 24 are intended to grip and hold the wire during the operation of heading the nails, and to that end are respectively arranged so that one groove in each will be coincident with the hole 20 through the vertical wall 21. The lower gripping-die of the pair is made adjustable up and down within short range by means of a vertical screw 26 underneath the same, whereby its operative groove is brought into proper alignment with the wire. The upper gripping-die of the pair is in like manner made adjustable by a vertical screw 27, and in addition is carried in a long transverse arm or lever 28, one end of which is pivoted between suitable rigid posts 29 by a strong bolt 30, that passes through them. The opposite end of this gripping-lever 28 is connected by means of a suitable link 31 to a longer lever 32, arranged parallel with the side of the machine. One end of this lever 32 is pivoted to the forward portion of the main frame 1 by a suitable bolt 33, provided with such screw-nuts 34 as are required for its adjustment. The extreme end of this long lever 32 farthest from its pivotal point is forked or formed in two branches 35, having between them a loose anti-friction roller 36, held in place by a transverse bolt 37, that rests upon an eccentric or cam 38, attached to and operated by the main shaft 2, so that each revolution of the same will cause the gripping-lever 28 to force its grooved die hard down upon the wire and thereby hold it for a short time with a vise-like grip during the operation of forming a head thereon, then by an upward movement release it, assisted in that respect by a strong spring 39 under the free end of said gripping-lever.

Figures 22, 24, 25, 26:
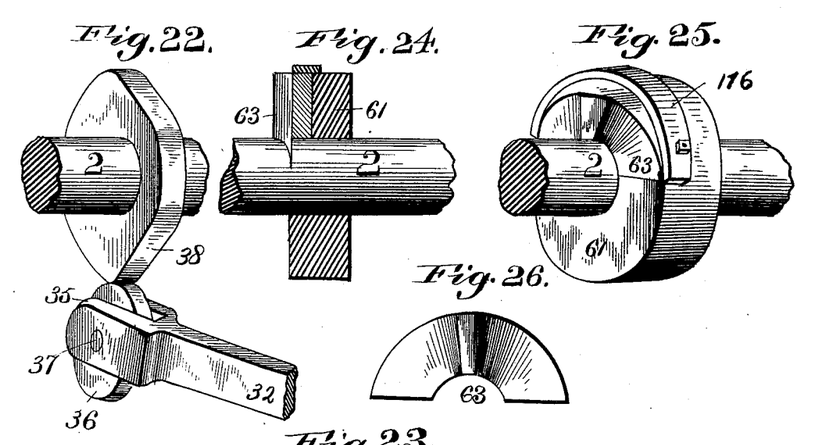

Fig. 22 shows in perspective the cam 38, the roller 36, and the end of the arm or lever 32.

Figures 7, 8, 9:
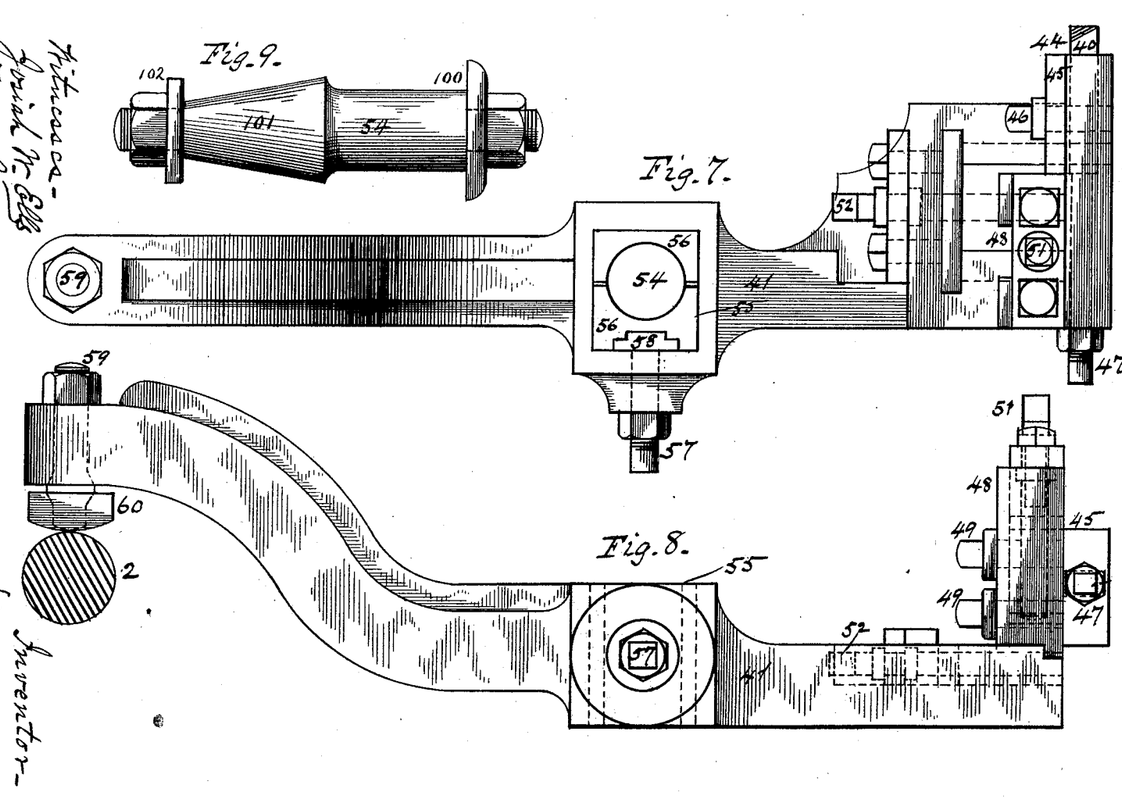
Fig. 7, an enlarged top view of one of the cutting-off and pointing levers.
Fig. 8, a side elevation of the same.
Fig. 9 represents the bolt or pintle upon which the lever works or vibrates.

A suitable distance back of the gripping-dies are located the pointing and cutting-off tools 40, that move laterally to and from the wire. Each tool 40 is supported on the end of a strong vibrating lever 41, as shown in the enlarged views, Figs. 7 and 8.

Figures 1, 13:
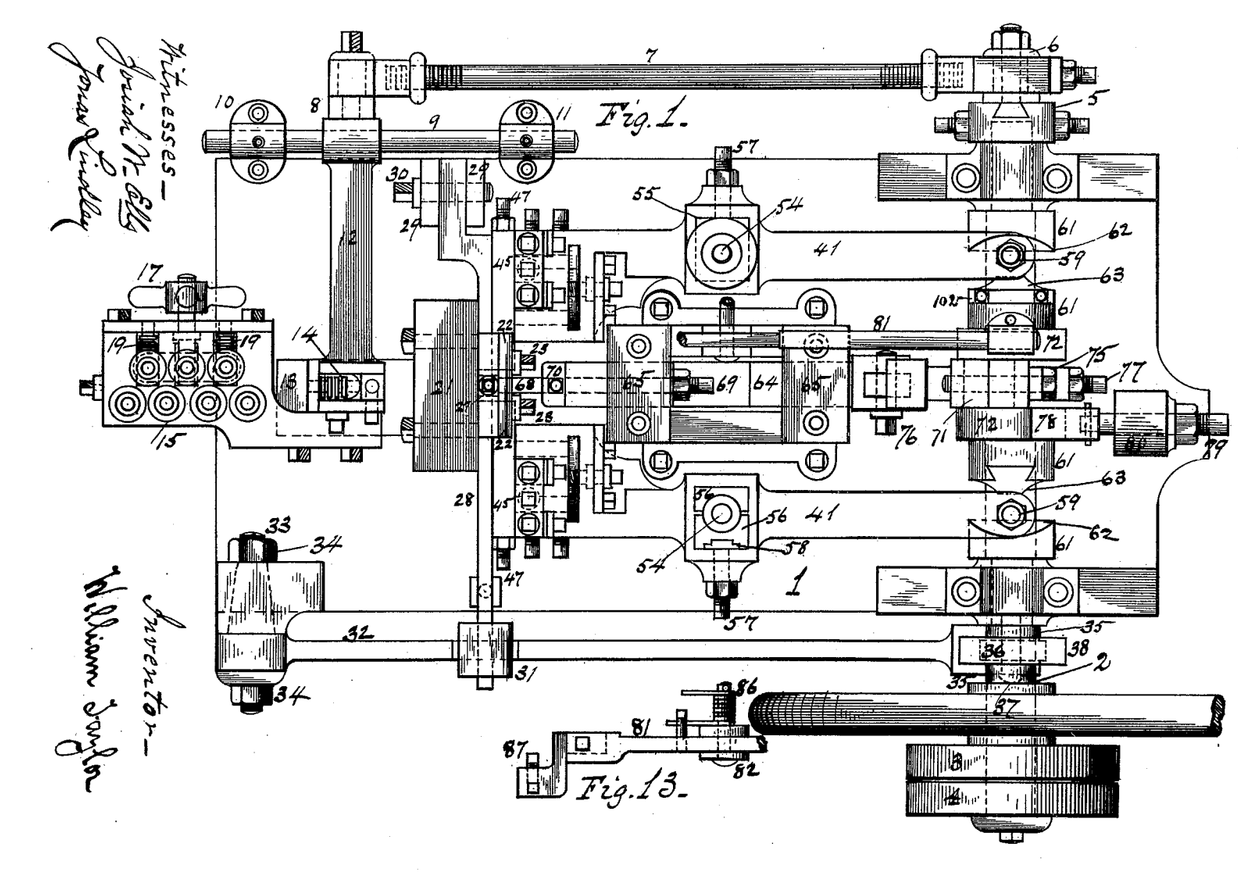
Figure 1 represents a top view or general plan of the entire machine.
Fig. 13, detached portion of knocking-off lever.
Figures 2, 12:
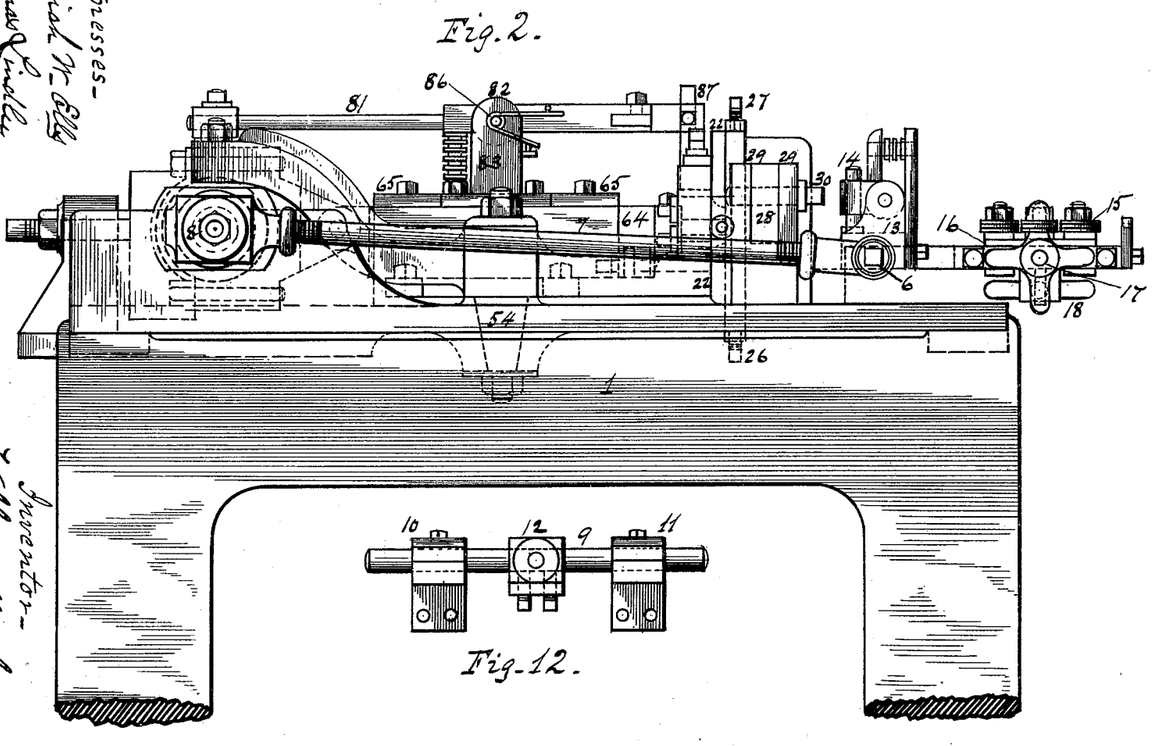
Fig. 2, a side elevation farthest from the driving-pulleys.
Fig. 12, detached portion of feed-rod and its bearings.
Figures 3, 11:
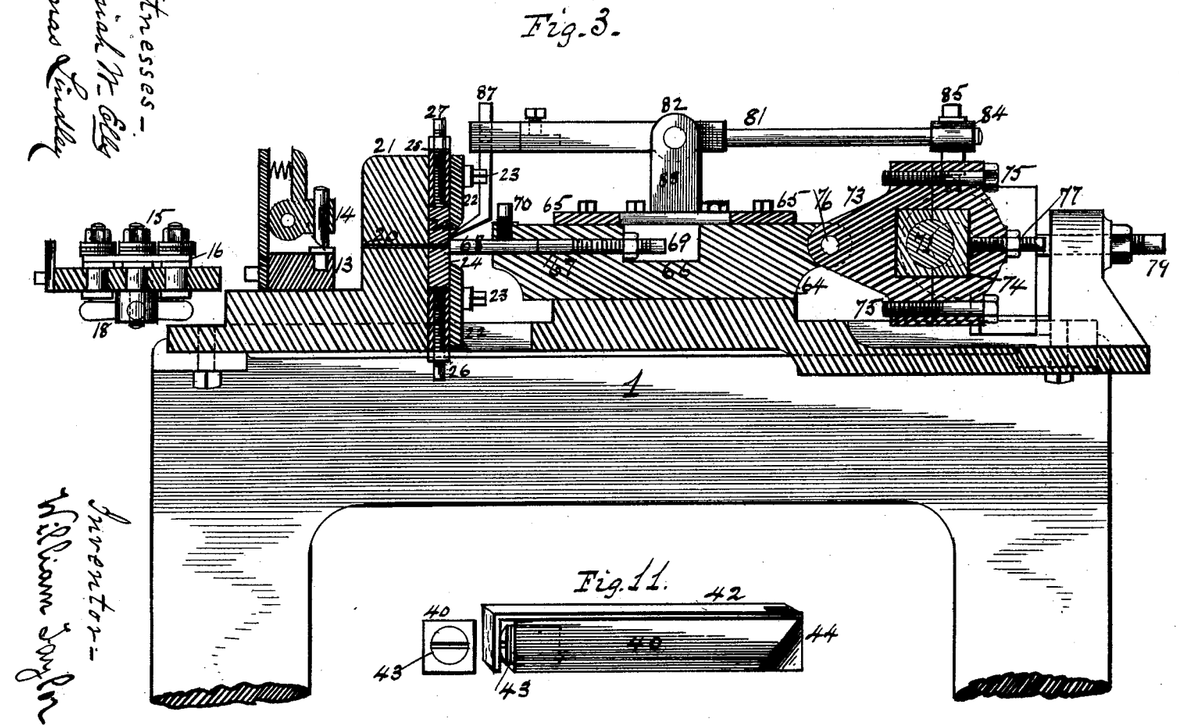
Fig. 3, a longitudinal sectional view of the machine.
Fig. 11, one of the pointing-tools with end view of same.
Figure 4:
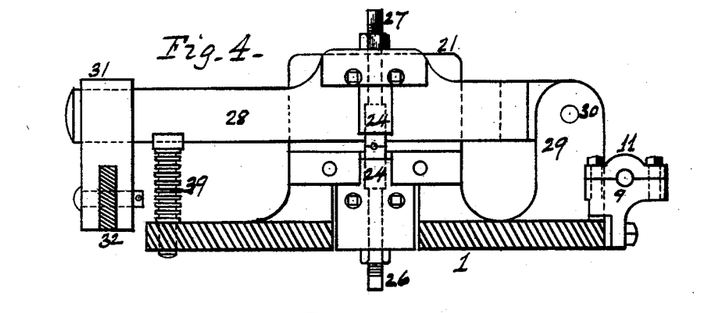
Fig. 4, a transverse vertical section of that portion of the machine containing the gripping-lever and the dies therein.
Figure 5:
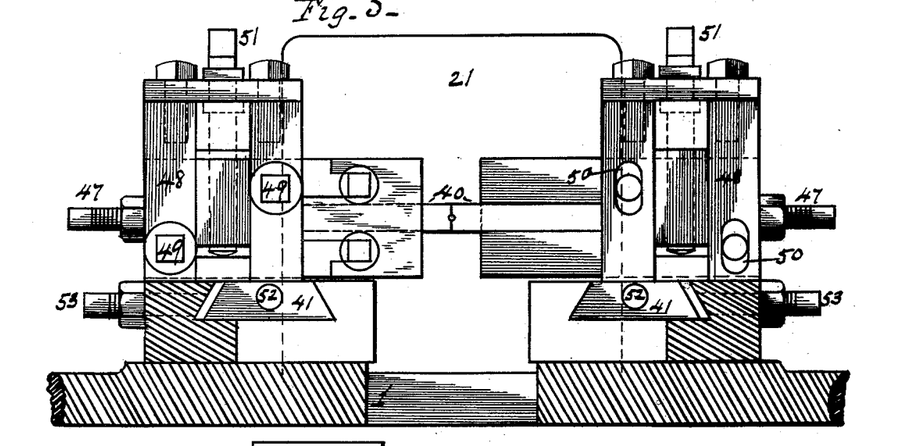
Fig. 5, a transverse section of the machine, showing an end view of the cutting-off and pointing levers, together with the means used for adjusting the cutters therein.

The means whereby the pointing-tools 40 are secured to the vibrating arms 41 admit of their adjustment in various directions. Each tool 40 (shown more particularly in the drawing Fig. 11) is provided with a plate 42, arranged on and along the tool and made adjustable thereon by means of a screw 43 in that end of the tool 40 farthest from its cutting-edge 44. Each tool 40, with its accompanying plate 42, is inserted in an appropriate carrier or box 45 with its cutting-edge 44 protruding a short distance outward therefrom, and is held in that position by means of a suitable pinch-screw 46. The tool 40 is also made adjustable endwise by a screw 47. This tool-box 45 is attached to a vertically-arranged support or block 48 by means of screws 49, that pass through oblong holes 50, (shown in the drawing Fig. 5,) whereby said box and its tool may be adjusted up or down by turning the central screw 51 in the top of said block. This contrivance for holding and adjusting the pointing-tools is attached to the vibrating arm 41 by being dovetailed thereon, as shown in the drawing Fig. 5, and made adjustable along said arm by a screw 52, and when so adjusted is held in place by pinch-screw 53. Thus it will be seen that I employ a three-part support for the die or tool, the three parts being shown in Figs. 14, 15, and 17 at 42, 45, and 48, all of which parts are adjustable relatively to and independently of the swinging arm which carries them. One part is adjustable vertically, another is adjustable toward and from the gripping-dies, and another is adjustable from and toward the path of the wire.

Figures 14, 14A, 15, 16, 17, 18, 19, 20, 21:
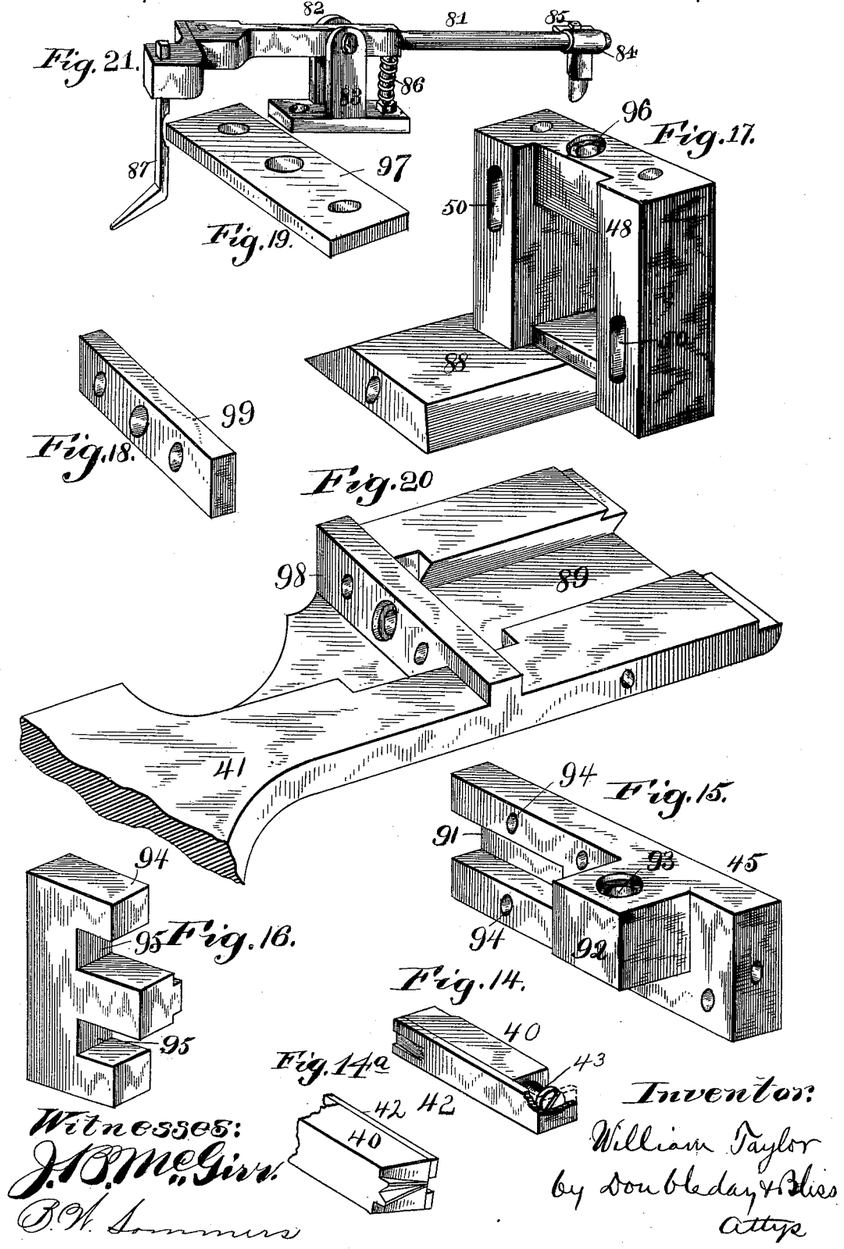

Fig. 17 is a perspective of part 48, which is adjustable toward and from the gripping-dies, it having two vertically-arranged legs and a dovetailed base-piece 88. The part 45 has a lug 92, which fits between the vertical legs of the part 48, and the vertical adjusting-screw passes through apertures 96 and 93.

Fig. 19 is a perspective of the top plate secured to the part 48.

Fig. 20 is a perspective of the swinging arm or lever 41, it having a dovetailed way 89 to receive the base 88 and a rib 98, through which passes an adjusting-screw, there being a plate 99 (shown in perspective in Fig. 18) secured against the rib for holding the ad-adjusting-screw.

I know that nail-machines have been used having cutting off or pointing levers arranged to swing in arcs of circles in planes transverse to the face of the grippers, and that on these levers the cutting-tools have been mounted in such way as to be adjustable longitudinally of the tools, there being screws behind them for pushing them; but it is impossible for such adjusting devices to attain all the numerous ends which can be reached by my mechanism, and which it is absolutely necessary to be attained if the best results are to be provided for.

Each vibrating arm 41 and the means employed for holding and adjusting the pointing tools being alike, except that one is right and the other left handed, a description of one will answer for both. These several arms 41, carrying the pointing-tools, are pivoted at or near their middle to the main frame 1 by means of vertical bolts 54, and to provide a suitable support each arm is formed with a rectangular crib 55, in which are placed a pair of bearing-boxes 56, that fit closely around said vertical bolt 54 and are kept tight by means of a screw 57, that presses against a steel spline 58, arranged between one box and the inclosing-crib 55, whereby said box may be forced inward to compensate for any undue wear, and thus maintain the parts in proper working condition. This provision for taking up the wear of the levers at their pivots is another important feature in my machine. The least variation of the points of the pointing or cutting tools from their correct lines of movement as they reach their operative position will result in faulty work. Such variation occurs as soon as any wear is caused at the pivot 54. This wear begins as soon as the machine is in operation. The difficulties resulting from it I overcome entirely by means of the devices thus described.

Another difficulty that has been experienced in the use of the machine of this sort has arisen from the "spring" of the cutter-levers and their pivots—that is to say, the cutters and pointers fail to come up exactly to the points wanted, owing to the tendency of the metal of the pivot-bolts to yield or bend under the severe strain exerted upon them in operation. This I have effectually ovecome by so constructing and arranging the pivot-bolts that not only can they have the wear compensated for which occurs at the parts that serve as journals for the levers, but also so that they shall have the parts inserted into the frame clamped against their supporting-walls with great rigidity, and so that they cannot yield in the slightest under the cutting strain. By examining Fig. 9 it will be seen that the journal part 100 of the pivot-bolt 54 has next to it a conical bearing portion 101, the large end of the cone being near the journal, and there being a clamping-washer and nut at 102 at the smaller end. This cone is seated in the frame, and by reason of its external shape can be tightly clamped in place, so as to prevent the slightest bodily movement under the strain of cutting, and, moreover, this conical form I find gives a much greater steadiness to the pivot, there being no spring whatever to the metal of the bolt when it is so formed. The remaining portions of these vibrating arms are curved upward and extend back, terminating over the main shaft 2, where each arm is fitted with a vertical pin 59, carrying at its lower end an anti-friction roller 60, that works between two cam-shaped collars 61, fixed to and around the said shaft. One of each pair of collars is formed with concave recess 62, and its opposing collar is provided with convex cam 63, which is constructed of hardened steel dovetailed into its collar in such a manner as to be readily detached therefrom when and as desired. Figs. 24 and 25, one being a section and the other a perspective of the parts now referred to, clearly illustrate their construction and arrangement.

After the steel part 63 has been inserted it is fastened in place by a holder 116, preferably of the form of the section of a ring bolted to the part 61. The holder can be readily removed for the purpose of replacing the part 63 with another. Fig. 26 shows the steel-wearing portion detached. The cam proper 63 comprises the projection 117 and the wings or plates 118, which extend laterally from the part 117 on lines parallel to the shaft and fit against the collar or cam-holder 61. The object of these cam-shaped collars is to vibrate the arms 41 in a horizontal plane and thereby give the pointing-tools a proper movement to and from the wire.

I am aware of the fact that it has been heretofore attempted to provide an adjustment of the cutting-tools by arranging the levers so that they should swing in a plane parallel to the gripping-dies on pivotal supports which can be bodily moved toward and from the gripping-dies—that is to say, the pivots and the levers have been so arranged that they were adjusted together relatively to said dies; but to those acquainted with this art it is well known that these levers which carry the cutting-off or pointing tools must be supported with the utmost rigidity possible, inasmuch as the least amount of wear or irregularity or lack of uniformity of movement is at once made manifest by an inferior operation of the machine. I therefore avoid moving the pivots of the levers when I want to adjust the cutters or pointers toward and from the grippers and provide an adjustment of the former entirely independent of any movement of the lever or of its pivot.

The means employed to head the nails comprise a stout heading-ram 64, arranged to move by a reciprocating action lengthwise of the machine, being held down in suitable bearings by transverse plates 65, bolted to the main frame. The central portion of this heading-ram 64 is depressed or provided with a deep rectangular recess 66, from which a longitudinal channel 67 extends through the nose of said ram, and in the outer end of this channel 67 is placed the heading-punch 68, and made adjustable in the direction of its axis by means of a suitable screw 69, being held to such adjustment by a transverse pinch-screw 70. To a central crank or wrist 71, between two thick circular disks 72, at or near the middle of the main shaft 2, is attached the sliding ram 64 by means of a yoke 73, formed in halves, inclosing a suitable bearing-box 74 around said wrist, and held together by bolts 75, that pass through each section of the yoke. That portion of the yoke nearest the ram is jointed thereto by a transverse bolt 76, which permits the yoke to move with the revolutions of the crank or wrist and actuate the ram in a rectilinear direction. The yoke is provided with a tightening-screw 77 to take up any wear or looseness that may occur in the boxes around the crank-wrist.

In all nail-machines wherein wire is headed by the action of a ram driven by a crank, cam, or eccentric attached to a revolving shaft, the backward strain upon the same is proportioned to the thickness and size of the head being formed, and when an excess of wire is fed forward, or a crooked nail is caught between the gripping dies and the heading-punch, the backward strain often bends the shaft. I avoid these disadvantages by combining with the shaft an abutment which bears against it at the time it is imparting to the ram the force requisite for the heading. I prefer to have this abutment so arranged as to bear uniformly at all times against the shaft. As many may be used in each machine as are deemed necessary; but I have found that all ordinary requirements are met by placing one near the center of the shaft adjacent to the place where the crank, wrist-pin, or other eccentric is situated. In the construction shown I have placed directly behind one of its circular disks 72 a concaved block 78, closely pressing against the disk and held thereto by means of a stout bolt or pinch-screw 79, supported in a substantial bearing 80, that may be an integral portion of the main frame or be bolted thereto.

Figures 23, 28, 29, 30:
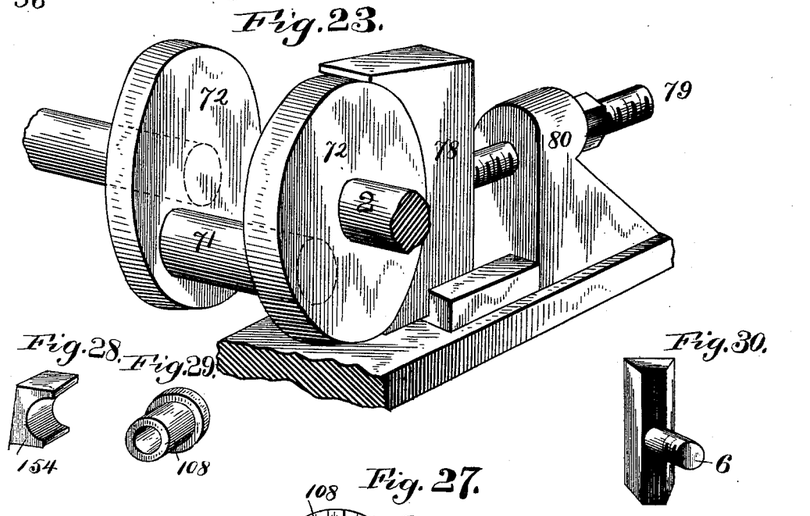

Fig. 23 shows in perspective the central part of the shaft, the wrist-pin, the abutment, and the devices for adjusting and holding it.

Occasionally a nail after being headed and pointed will adhere to the end of the wire by a very thin tenure and require to be knocked off. To break this connection, a straight bar 81 is supported by a pivotal joint 82 in a vertical frame 83, so that each end of said bar may move up and down vertically. One end of this bar or lever 81 is arranged over the main shaft, so as to be acted upon by a suitable cam revolving therewith. This end of the knocking-off lever 81 is provided with a short sleeve 84, carrying another cam that operates in conjunction with that on the shaft to actuate the lever at the proper time. This sleeve 84 is held in place by a short pinch-screw 85.

Fig. 21 is a perspective of the knocking-off lever and showing the attachments thereto.

The object of this contrivance is to enable the cams to be kept in close-working position by setting that on the lever toward that on the revolving shaft whenever a separation by wear demands it. A spiral spring 86, coiled around the pivotal bolt of the lever, produces a downward pressure of its cam. The opposite end of this knocking-off lever 81 is provided with an adjustable steel finger 87, the point of which occupies a position directly over the pathway of the newly-made nails, whereby each depression of the finger will serve to knock them free from the wire.

Having thus described my improved wire-nail machine, I claim—

1. In a wire-nail machine, the combination of one set of fixed straightening-rolls with another set mounted in a plate adjustable toward and from the fixed rolls, a hand-screw at the center of said plate for adjusting the same, a pinch-screw for retaining the plate in proper adjustment, and springs at each end of said plate operating to press the same toward the fixed rolls.

2. In a wire-nail machine, the combination of a pair of pivoted arms provided with pointing and cutting-off tools mounted in suitable sliding boxes, each box resting in a block mounted in ways on its respective lever or arm, a screw for adjusting each sliding box on its block, and a screw for giving each block a prescribed sliding movement on its vibrating arm.

3. In a wire-nail machine, the combination of a pair of pivotal arms supporting the adjusting mechanism of the pointing and cutting-off tools, a crib or mortise through the central portion of said arms, a divided bearing-box inclosed by said crib, a spindle or pivot within each bearing-box, and a screw for adjusting one of the sections of said bearing-box against its respective pivot.

4. In a wire-nail machine, the combination consisting of a pointing or cutting-off tool with a plate extending lengthwise of said tool and a screw in the end of the cutter to adjust said plate along the same.

5. In a wire-nail machine, a knocking-off device consisting of an arm provided with a sleeve around one end thereof, an arm adjustably attached to said sleeve, and a means for adjusting said arm with relation to a cam on the main shaft, whereby the parts are kept or maintained in proper working position.

6. The combination of a pivoted knocking-off lever provided with an adjustable arm on one end, an adjustable finger at its opposite end, and a means for operating said lever.

7. In a wire-nail machine, the combination consisting of the main shaft with cams for operating the gripping and cutting-off dies, a crank or similar device for actuating the heading-ram, and a thrust-block behind said shaft to prevent backward strain from bending the shaft.

8. In a wire-nail machine, the combination of a main shaft, a disk or thick collar thereon, a block fixed close against said disk or collar, and a means for pressing the same thereto.

9. In combination with a mechanism for holding wire during the operation of forming a head thereon, a reversible gripping-die provided with two grooves that intersect and cross each other.

10. In combination with a mechanism for holding wire during the operation of forming a head thereon, a reversible gripping-die provided with two grooves that intersect and cross each other on one or both ends of said gripping-die.

11. In a wire-nail machine, the combination of the gripping-dies, a pair of swinging arms, the pivots which hold said arms, the pointing or cutting dies, and the three-part supports for said dies, one of the parts of each of which is adjustable toward and from the gripping-dies relatively to the swinging arms, substantially as set forth.

12. In a wire-nail machine, the combination of the gripping-dies, the swinging arms movable on lines transverse to the path of the wire, the pointing and cutting-off dies, the vertically-adjustable carriers for the said cutting-off dies, and the supports for said carriers, adjustable upon and relatively to the swinging arms, substantially as described.

13. In a wire-nail machine, the combination of the gripping-dies, the swinging arms, the pointing and cutting-off dies, the carriers for said dies, adjustable on lines transverse to the path of the wire, and supports for the said carriers, adjustable both relatively to the vibrating arm and toward and from the gripping-dies, substantially as set forth.

14. In a wire-nail machine, the combination of the rotary shaft, the cam thereon, the gripping-dies, the vibrating lever engaging with said cam, a pointing or cutting die, and a three-part support for said die on said lever, one of the parts of said support being adjustable toward and from the path of the wire, and another part being adjustable toward and from the gripping-dies relatively to the axis of vibration of said arm, whereby the action of the cam can be maintained uniform and the pointing-die can be adjusted in relation to the gripping-dies, substantially as set forth.

15. In a wire-nail machine, the combination of the vibrating arms, the pivots for said arms situated transversely to the path of the wire, the pointing or cutting dies, and the three-part supports for the dies on said arms, one of the parts of each of said supports being adjustable toward and from the end of its vibrating arm, substantially as set forth.

16. In a wire-nail machine, the combination of the gripping-dies, a rotating shaft, a cam thereon, the vibrating lever, the pivot therefor, the pointing-die, the carrier for said pointing-die, adjustable across the face of the gripping-die, and the support for said carrier, connected to the said vibrating lever and adjustable relatively to the said lever, substantially as set forth.

17. In a wire-nail machine, the combination of the tool-carrier 45, the holder 48, the lever 41, and the means for adjusting the holder 48 on and independently of the lever 41, substantially as set forth.

18. The combination of the tool-carrier 45, having the adjusting projection 92, the holder 48, having the base 88 and the vertical slots at 50, the lever 41, having a way for the base 88, and means for securing the said base to the said lever in different positions, substantially as set forth.

19. In a wire-nail machine, the combination, with a heading-ram and a shaft which intermittingly actuates said ram, of an adjustable abutment for the shaft opposite to the ram against which the shaft bears in actuating the ram, substantially as set forth.

20. In a wire-nail machine, the combination of a heading-ram, a rotating shaft, a wrist-pin or eccentric thereon connected to the ram and intermittingly actuating it, and an adjustable abutment for the shaft immediately adjacent to said wrist-pin or eccentric, substantially as set forth.

21. In a wire-nail machine, the combination, with the heading-ram, the shaft which actuates it, a wrist-pin or eccentric on said shaft, the divided yoke hinged to the ram and connected with the said wrist-pin or eccentric, and the divided bushing in the said yoke, of the set-screw passing directly through and engaging with one part of said yoke and bearing directly against one part of said bushing, the said bushing or bearing preserving a uniformity of contact thereof with the wrist-pin or eccentric, substantially as set forth.

22. In a wire-nail machine, the combination, with the cutting-dies and the swinging levers which actuate said dies and the pivots which hold the levers, of the divided bearings or bushings interposed between the levers and the pivots and adjustable relatively thereto, substantially as set forth.

23. The combination, with the cutting-die, the swinging lever which actuates said die, and the pivot around which said lever swings, of the divided bearing or bushing interposed between the lever and the pivot, and the set-screw bearing against the said bushing, by which wear can be taken up and the bushing can be clamped, substantially as set forth.

24. In a wire-nail machine, the combination, with the cutting-tool and the swinging lever which actuates said tool, of the pintle or pivot for said lever, having the journal part 100, and the cone 101, secured in the frame, substantially as set forth.

25. The combination of the driving-shaft, the lever vibrating in a plane parallel to the shaft, the cam-carrier secured to the shaft, and the cam detachably secured to said carrier and projecting from the carrier on lines parallel to the shaft, substantially as set forth.

26. The combination, with the cam-carrier having a dovetailed groove, of the cam detachably fitted in said groove and a holder for the cam, substantially as set forth.

27. The combination, with the lever and the cam-carrier, of the detachable cam having a projection to engage with the lever and the tapering wings or plates extending laterally from said projection, as set forth.

28. In a wire-nail machine, the combination, with the cutting-tool, the lever which carries it, and the driving-shaft, of the cam or bearing-piece for the said lever, and the carrier for said cam, having the latter secured thereto detachably, said carrier being permanently secured to the shaft, substantially as set forth.

29. In a wire-nail machine, the combination, with the wire-feeding devices, the pitman or connecting rod, and the driving-shaft, of the adjustable eccentric-bearing comprising a wrist-pin connected to the shaft and the sleeve on said wrist-pin, the divided bushing interposed between said sleeve and the connecting-rod, and the adjusting devices engaging with the said bushing, substantially as set forth.

30. In a wire-nail machine, the combination, with the wire-feeding devices, the pitman or connecting rod, the eccentric which actuates said rod, and the driving-shaft, of the yoke 108, the divided bushing in the said box and interposed between it and the eccentric, and the adjusting-screw 107, bearing directly against the said bushing, substantially as set forth.

WILLIAM TAYLOR.

Witnesses:
JOSIAH W. ELLS,
JONAS LINDLEY.